No. 723,652. PATENTED MAR. 24, 1903.
T. COLLIER.
BALING PRESS.
APPLICATION FILED SEPT. 10, 1902.
NO MODEL. 2 SHEETS—SHEET 1.
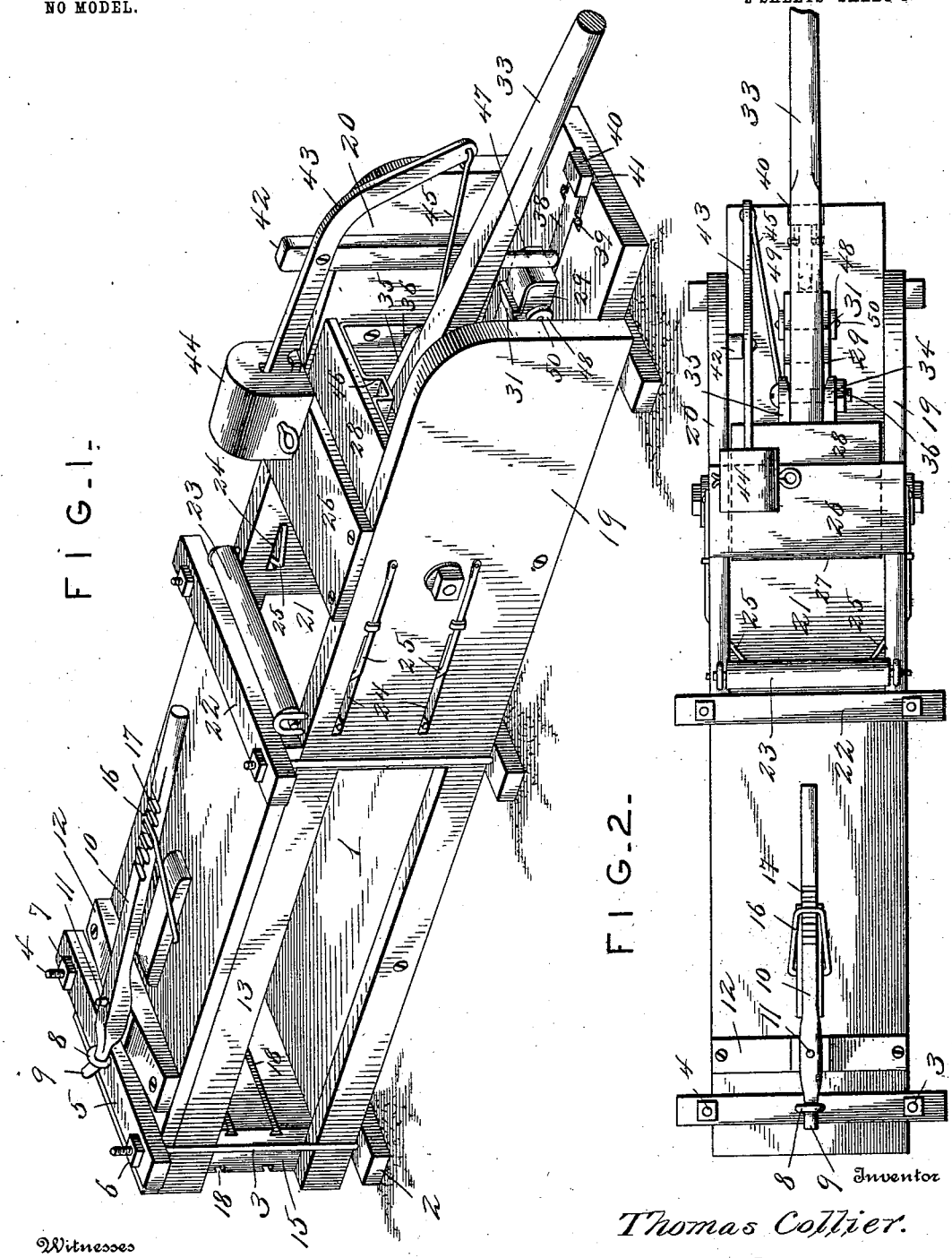
Witnesses
Harry L. Amer.
B. F. Funk
Inventor
Thomas Collier.
By Victor J. Evans
Attorney No. 723,652. PATENTED MAR. 24, 1903.
T. COLLIER.
BALING PRESS.
APPLICATION FILED SEPT. 10, 1902.
NO MODEL. 2 SHEETS—SHEET 2.
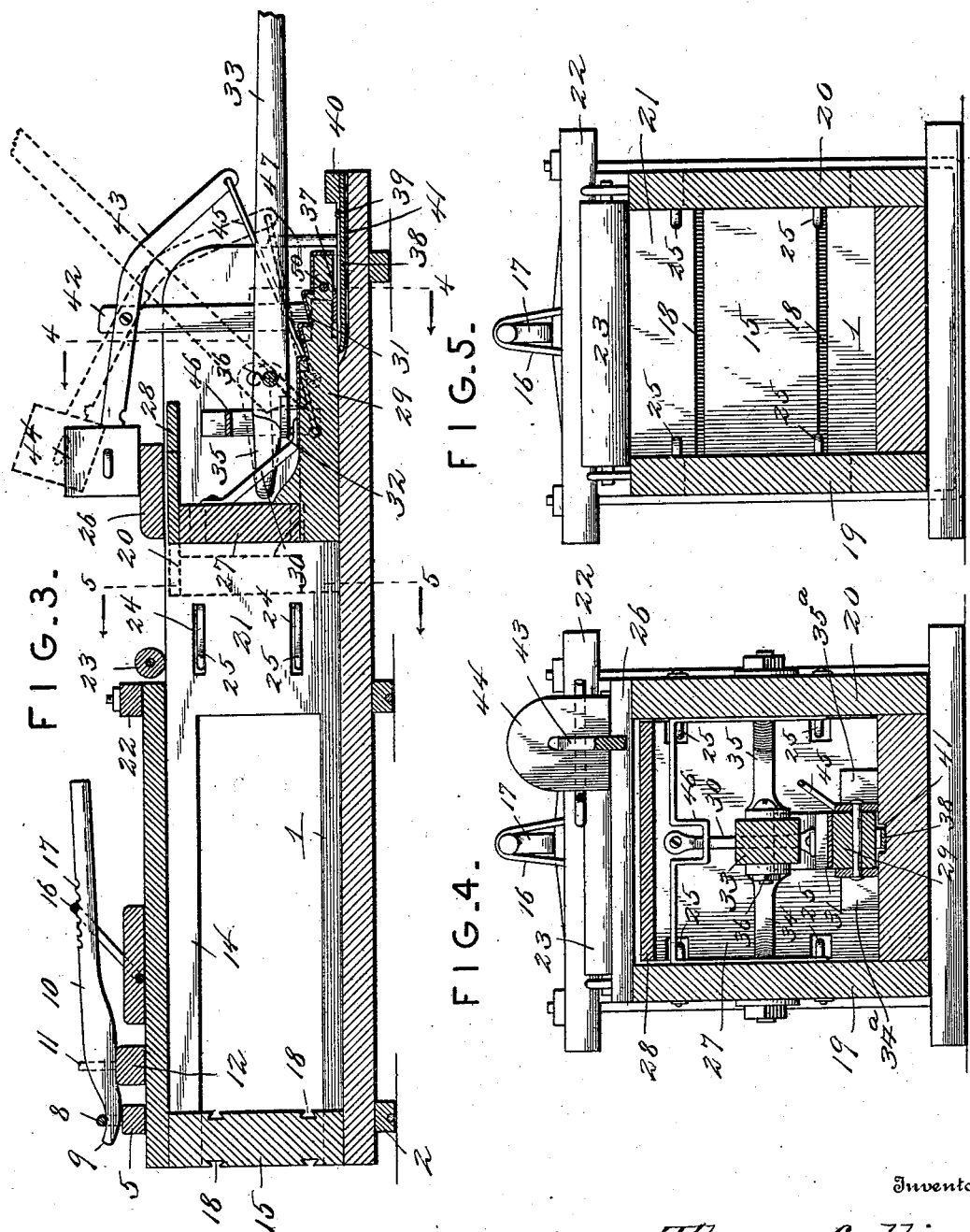

UNITED STATES PATENT OFFICE.

THOMAS COLLIER, OF TREZEVANT, TENNESSEE.

BALING-PRESS.

SPECIFICATION forming part of Letters Patent No. 723,652, dated March 24, 1903.

Application filed September 10, 1902. Serial No. 122,832. (No model.)

*To all whom it may concern:*

Be it known that I, THOMAS COLLIER, a citizen of the United States, residing at Trezevant, in the county of Carroll and State of Tennessee, have invented new and useful Improvements in Baling-Presses, of which the following is a specification.

This invention relates to baling-presses, and particularly to the type known as a "rebounding plunger."

The object of the invention is to provide a durable and efficient means for applying force to the plunger and to compress the bale within the baling-chamber.

Another object is to provide a novel construction of retracting device for causing the plunger to rebound into position to be again projected toward the bale as soon as the baling-lever is released therefrom.

With these objects in view the invention consists in certain novel features of construction and combination of parts to be referred to hereinafter and illustrated in the accompanying drawings, in which—

Figure 1 is a perspective view of a baling-press constructed in accordance with my invention. Fig. 2 is a top plan view of the same. Fig. 3 is a vertical longitudinal sectional view through the same. Fig. 4 is a transverse sectional view on the line 4 4 of Fig. 3, and Fig. 5 is a cross-sectional view on the line 5 5 of Fig. 3.

The reference-numeral 1 designates a baling-chamber which is provided with sides, top, and bottom. At the rear end of the baling-chamber and secured to the transverse base-bar 2 are two upwardly-projecting rods 3 and 4, which project through a transverse bar 5, which is secured thereto by nuts 6 and 7. Intermediate the ends of the bar 5 is an eye or socket 8, through which projects the reduced end 9 of the lever 10, which is fulcrumed to the eye or socket and is fastened to the top of the baling-chamber by a pin 11, which projects from a rib or bar 12 on the top thereof. The top of the baling-chamber is secured to two rearwardly-extending spring-arms 13 and 14, which are interposed between the rods 3 and 4. By pressing down upon the lever 10 the spring-arms will be forced toward the bottom of the baling-chamber, carrying with them the top, which will clamp the head-block 15 to any point of adjustment from the rear of the chamber to a point adjacent the hopper.

The arms and top can be held in their adjusted position by means of a bail 16, which is pivoted to the top of the baling-chamber and engages one of the teeth of the rack 17 on the lever 10. The head-block 15 is provided with dovetail grooves 18, extending transversely thereof, so that the baling wire or tie can be passed in the grooves when the bale is made so as to tie up the bale.

Projecting forwardly from the baling-chamber are two parallel guides 19 and 20, which are formed integral with the arms 13 and 14 and serve as sides for the hopper 21 and as guides for the plunger, to be referred to hereinafter. The sides are secured to the bottom and top by a clamp 22, which comprises two transverse bars at the top and bottom, connected by adjusting-rods at their ends.

The revoluble roller 23 is arranged in suitable journals in the top edges of the sides, so as to assist the material to be baled in entering the hopper. On the sides of the hopper are arranged parallel slots 24, in which are spring-fingers 25, so as to retard the backward movement of the material to be baled when it is compressed by the plunger.

As above stated, the plunger is guided by the sides 19 and 20 and is assisted by a top guide 26. This plunger, which is designated by the reference-numeral 27, has a rearwardly-extending flange 28 at its top which may bear against the guide 26 and prevent an upward displacement thereof. From the bottom of the follower 27 is a forwardly-extending follower-bar 29, which is braced to the follower by a suitable metallic brace 30. This follower-bar 29 is provided with a longitudinally-arranged series of transverse teeth 31, which are adapted to be engaged successively by a projecting lip 32 of the plunger-lever 33. This plunger-lever is pivoted to a pair of swinging link-bars 34 and 35, which are in turn pivoted to the sides 19 and 20. A pivot or bolt 36, which connects the plunger-lever to the links, constitutes a fulcrum for the lever, so that the lever can be raised out of engagement with the rack after the plunger is projected forward, so as to engage the teeth successively. When the follower has reached the end of its stroke or has been projected as far as the lever is capable of projecting it, a shoulder 37 on the under side of the follower-bar will be engaged by a pivoted trip-lever 38, which constitutes a locking means whereby the follower will be held in its projected position. On the forward end of the lever 38 and on the opposite side of the fulcrum 39 is a weight 40, which will cause the end opposite from the weight to be tilted up into engagement with the shoulder 37 as soon as the shoulder has passed the end of the lever.

Inasmuch as the lever normally rests in a slot 41 of the bottom, the follower-bar can move back and forth thereover without interruption until the shoulder 37 moves rearwardly past the end of the lever. Pivoted to a vertical standard or support 42, carried by one of the sides, is a weighted lever 43, on one end of which is an adjustable weight 44. The forward end of the lever is connected to the follower-bar by a link 45. As soon as the lever 33 has reached the end of its stroke the end which has engaged the rack will be forced up to an engagement with the U-shaped projection or loop 46, interposed between the sides 19 and 20 and immediately above the lever. This projection or abutment 46 will act as a permanent fulcrum on the lever, so that a downward pressure of the handle thereof will cause a pin 47 to come in contact with the lever 38, thereby depressing it into a slot 41 and releasing the follower-bar. As the resistance to the retraction of the lever will then be removed, the weight 44 will be sufficient to carry one end of the lever downward, thereby raising the other, during the course of which movement the follower-bar will be retracted through the medium of the link 45 to a position whereby it can again be operated by a lever 33. The rear movement of the follower is limited by two stops 34ª and 35ª, which rest on the bottom of the case and against which the follower is adapted to strike. These stops prevent the follower-bar from striking against the pin and causing it to break off. Antifriction-rollers 48 and 49 are connected to a transverse shaft 50 and run in the bottom of the baling-press.

It will thus be seen that I have provided an effective and durable baling-press which will readily perform the services for which it is intended.

I claim—

1. In a baling-press, the combination with a compression-chamber, of a longitudinally-movable follower therein, a pivoted weighted lever arranged adjacent to the follower and connected thereto, means for projecting the follower within the compression-chamber, a trip-lever for holding the follower locked at the end of its movement, and means for releasing the trip-lever whereby the weight will retract the follower.

2. The combination with a baling-press provided with a compression-chamber, of a follower therein adapted to move longitudinally of the press, a longitudinally-arranged bar connected to the follower and provided with shoulders or teeth, a lever adapted to successively engage the teeth to project the follower rearward toward the compression-chamber, a locking device for securing the follower against a return movement, a pivoted lever connected to the follower-bar and adapted to retract the follower-bar away from the compression-chamber, and means on the first-named lever for engaging the locking device when the follower is at the end of its forward movement so that the follower will be released and retracted.

3. The combination with a baling-press provided with a compression-chamber, of a follower designed to move longitudinally of the press and toward the compression-chamber, a locking device designed to automatically lock the follower against a return movement, a pivoted lever and means on the lever for releasing the locking device so that the follower can be retracted.

4. The combination with a baling-press provided with a compression-chamber, of a longitudinally-movable follower therein, a lever, swinging-link connections secured to the lever and to the sides of the press, said connections forming a moving fulcrum for the lever, a locking device for holding the follower against rear movement, a releasing means on the lever for engaging the locking means so that the follower can be returned and a fixed fulcrum arranged adjacent to the lever and against which it will contact when the follower is at the end of its stroke and so that the releasing means on the lever will engage the locking means and release it from contact with the follower.

5. The combination with a baling-press provided with a compression-chamber, of a longitudinally-movable follower, a lever for operating the follower, means for locking the follower at the end of its stroke and means on the lever for engagement with the locking means to release the follower and to permit it to be retracted from the compression-chamber.

6. In a baling-press the combination with a longitudinally-movable follower, of a lever for operating it, means for locking the follower against return movement, a weighted lever connected to the follower and designed to retract it, a fixed fulcrum above the lever with which the lever is designed to contact to cause it to engage the locking means to permit the weighted lever to retract the follower.

7. In a baling-press, the combination with a pair of spring-arms arranged in the rear thereof, of a connecting means for the arms, a cam-lever arranged above the compression-chamber and designed to bear upon the top thereof, a series of graduations or teeth on the lever, and a bail for engaging the teeth of the lever to hold the arms in a compressed position.

8. The combination with a baling-press provided with a compression-chamber, of spring-arms arranged adjacent to the top of the compression-chamber and on which the top is secured, a support arranged above the arms, a graduated lever carried by the support and designed to bear upon the top of the compression-chamber, and means for successively engaging the graduations on the lever for the purpose set forth.

9. The combination with a baling-press provided with a compression-chamber, of spring-arms arranged near the top of the compression-chamber onto which the top is secured, a removable head-block in the chamber and adapted to be engaged by the top, a pivoted lever for depressing the top to adjustably engage the head-block, a pivoted bail carried by the top of the compression-chamber and designed to adjustably engage the lever whereby the head-block can be adjustably secured within the compression-chamber.

In testimony whereof I affix my signature in presence of two witnesses.

THOMAS COLLIER.

Witnesses:
R. M. MURRAY,
J. B. PEYTON.